United States Patent
Rindelaub

(10) Patent No.: US 6,423,532 B1
(45) Date of Patent: Jul. 23, 2002

(54) REFUSE-TREATMENT METHOD AND APPARATUS

(75) Inventor: Frank Rindelaub, Bôle (CH)

(73) Assignee: Linde BRV Biowaste Technologies AG, Zug (CH)

( * ) Notice: Subject to any disclaimer, the term of this patent is extended or adjusted under 35 U.S.C. 154(b) by 0 days.

(21) Appl. No.: 09/367,954

(22) PCT Filed: Feb. 17, 1998

(86) PCT No.: PCT/EP98/00888

§ 371 (c)(1),
(2), (4) Date: Aug. 24, 1999

(87) PCT Pub. No.: WO98/38145

PCT Pub. Date: Sep. 3, 1998

(30) Foreign Application Priority Data

Feb. 24, 1997 (EP) .............................................. 97810096

(51) Int. Cl.⁷ .............................. B03B 5/64; B09B 3/00
(52) U.S. Cl. ........................ 435/262.5; 71/10; 209/172; 209/172.5; 209/173; 435/289.1
(58) Field of Search ........................... 71/8, 10, 11, 14; 210/603, 605; 422/900; 209/172, 172.5, 173, 930; 435/262.5

(56) References Cited

U.S. PATENT DOCUMENTS

| | | | | |
|---|---|---|---|---|
| 2,025,841 A | * | 12/1935 | Young | |
| 2,530,676 A | * | 11/1950 | Berg et al. | |
| 2,559,403 A | * | 7/1951 | Cover | |
| 4,769,149 A | * | 9/1988 | Nobilet et al. | 210/603 |
| 4,944,868 A | * | 7/1990 | Jay, Sr. et al. | 209/173 |
| 5,082,486 A | * | 1/1992 | Glogowski | 71/10 |
| 5,521,092 A | | 5/1996 | Rindelaub et al. | |
| 5,542,962 A | * | 8/1996 | Ollerenshaw et al. | 71/10 |
| 5,720,393 A | * | 2/1998 | Wedel et al. | 209/273 |
| 5,957,301 A | * | 9/1999 | Wedel et al. | 209/173 |

FOREIGN PATENT DOCUMENTS

| | | | |
|---|---|---|---|
| CH | 685 981 | | 12/1978 |
| EP | 228 724 | * | 7/1987 |
| EP | 359 250 | * | 3/1990 |
| EP | 0 767 011 | | 9/1997 |
| GB | 2 230 004 | * | 10/1990 |

* cited by examiner

Primary Examiner—Wayne A. Langel
(74) Attorney, Agent, or Firm—McDermott, Will & Emery; Paul Devinsky

(57) ABSTRACT

A method of treating household refuse wherein selection, communication, etc., the fraction of the total refuse containing biodegradable organic dry matter is delivered to an anaerobic fermentation process. Anaerobic fermentation is carried out until all the dry matter is exhausted, degradation rates of the biodegradable organic dry matter ($OTS_{biol}$) of 70% and more being attained. The resultant fermentation residue is subjected to a drying process in which the dry matter portion is increased to at least 90%. The resultant dry material no longer exhibits any biological activity. The exhaustive anaerobic fermentation process enables a maximum amount of biogas to be produced, its energy content being sufficient to supply the drying process. A further aspect of the reduction of the problematic refuse portion is the separation out of a fine-grained fraction (particle size >15 to 14 mm) which is purified wherein adherent material, particularly organic dry matter is removed, by counterflow washing in a washing unit so that inert material having an organic dry matter portion of at most 5% is produced. Washing may be carried out using process condensate such that a closed water circuit results.

23 Claims, 3 Drawing Sheets

REFUSE-TREATMENT METHOD AND APPARATUS

BACKGROUND OF THE INVENTION

The present invention is related to a biological-thermal process. More particularly the present invention relates to a biological-thermal process for the treatment of refuse. Further, the present invention relates to an installation for performing a refuse treatment process and to products obtained from that process.

Household refuse consists essentially of water and so-called total dry matter (TDM). The TDM in turn comprises as an essential content, so-called biologically degradable organic dry matter (ODM), the major portion of which is biologically degradable ($ODM_{biol}$).

The disposal of household refuse must comply with the general requirement that the mass to be finally disposed of in a dump must be as low as possible. Furthermore relevant legislation provides for limiting, in particular, the ODM content in the dump refuse. The separation of reusable material from the household refuse has been attempted to reduce the ODM mass to be dumped. The reduction of ODM has also been obtained in known processes by composting under aerobic conditions. The heat developed during composting is used for drying the material. Drying down to 15% by weight of residual water or, in other words, up to 85% of dry matter (DM) in the resulting final product can be obtained by an appropriate preparation of the material to be composted (e.g. by drying) and by adjustment to optimum parameters during composting (e.g., temperature). Absent a contrary indication, percentages that are given in this specification are to be understood as by weight.

In known installations, composting is preceded by a fermentation step, i.e. an anaerobic fermentation, in order to generate biogas. Generally, this biogas is combusted at the site in a heating and power station attached to the installation. The energy recovered, generally thermal and electric energy, is used for internal purposes and may also be utilized otherwise.

SUMMARY OF THE INVENTION

An object of the present invention is to obtain a further reduction of the amount of the final products of a refuse treating installation which must be finally disposed of in an expensive manner.

Another object of the present invention is to increase the dry matter fraction of the final products which are to be finally disposed of.

A further object of the present invention is to increase, during refuse treatment, the content or the creation of those products which can be disposed of without problems and/or which are reusable.

At least one of the above indicated objects is implemented by a biological-thermal process for the treatment of refuse in which an essential portion of the refuse, which is accessible to fermentation, is subject to anaerobic fermentation, and the fermentation residue thus obtained is dried, without further composting, until a dry matter content of at least about 90%, and more preferably 95%, is obtained. The dry material is subjected to screening and/or sifting in order to separate it into fractions of different particle sizes, different materials and/or different specific gravity or mass.

According to the process, household refuse is fed into a fermenter after having passed usual preparation steps, such as comminuting, metal separation, screening, etc. The operating conditions of the fermenter are selected in such a manner that the fermentation in the fermenter is conducted until any fermentation activity in the fermentation residue has dried away (exhaustive fermentation), thus obtaining a maximal decomposition of the $ODM_{biol}$.

Further treatment methods, which are per se known, may be applied to the fermentation residue, for example a separation under pressure in order to achieve a separation into a solid fraction and a liquid fraction.

The fermentation residue is subjected to a drying step, preferably together with other refuse components previously removed, until a dry matter DM content of at least about 90% is attained. The energy necessary for this step is preferably taken from the combustion of the biogas formed during fermentation. Generally, a sufficient amount of biogas is generated such that the thermal portion of the electric power generation from a fueled power station, e.g. a block-type thermal power station, is obtained by combusting the biogas.

Preferably, the fermented material has a content of biologically degradable dry matter of at most 30% by weight of the proportion present prior to fermentation.

Preferably, the fermentable portion of the refuse obtained by pre-sorting, or the total amount of the refuse, is subjected to a separation process, preferably in an extruder press having a final operating pressure of at least about 700 bar, by manual sorting, by mechanical sorting, by screening or a combination of methods, in order to a separate the refuse into a solid matter portion and a pulp portion, the pulp portion containing essentially all of the biologically degradable organic substance content which is subjected to anaerobic fermentation.

Preferably the biogas formed during the anaerobic fermentation is combusted, preferably in a block-type thermal power station, producing sufficient electric energy for the drying process.

Preferably, a liquid fraction is mechanically separated from the fermentation residue, the liquid fraction being concentrated to a dry matter content of at least 35% by vaporization of water. Preferably, prior to the concentration process the pH of the liquid fraction is adjusted, to a neutral or slightly acidic value, and more preferably to a value in the range of from 5 to 6, in order to suppress the formation of gaseous ammonia during the concentration process.

In accordance with another aspect of the invention, there is provided a process for the treatment of a fine fraction of refuse having an upper particle size selected from within the range of from about 15 to 40 mm, the fine fraction being conveyed to a hydrosifter having at least one washing spiral, wherein the fraction having a higher specific gravity which settles at the bottom of the hydrosifter will be carried away by the washing spiral, and wherein washing liquid is charged into the output end of the washing spiral and runs through the washing spiral countercurrently to the conveying direction of the spiral in order to carry substances adhering to the refuse particles back into the hydrosifter.

Preferably, the condensate formed during the concentrating is used as the washing liquid in the washing spiral.

Preferably, polluted water from the washing of the fine fraction in the washing unit is used for humidifying the fermentable refuse portion in order to adjust the humidity content of the fermentable refuse portion to that needed for aerobic fermentation.

In accordance with yet another embodiment of the invention there is provided an apparatus for the treatment of refuse comprising a fermenter for carrying out an anaerobic fermentation, the fermenter being operable through an adjustment of operational parameters, such as dwell time and filling height, whereby material discharged from the fermenter is essentially not further biodegradable and in particular not further fermentable, and a drying device disposed downstream of the fermenter for drying at least the fermented matter to a dry substrate content of at least 90% whereby a product having essentially no biological decomposition activity is produced.

Preferably, at least one screening device and/or a sifter is provided down stream of the drying device for separating the dry, biologically inactive material into fractions according to specific gravity and/or particle size.

Preferably, the fractions comprise a fine particle fraction and a coarse particle fraction, the upper limit of the particle size of the fine fraction being selected within the range of from 2 to 10 mm.

In accordance with yet a further aspect of the invention, there is provided, the material comprising a dry substance content of at least 90% and preferably at least 95% and being biologically inactive.

In accordance with yet a further aspect of the invention, there is provided a material obtained by the process described above, wherein the material is granular, having a upper particle size in the range of from 15 to 40 mm, and having a maximum organic dry matter content of 5%, determined as its ignition loss.

BRIEF DESCRIPTION OF THE DRAWINGS

The invention will now be explained in more detail with two exemplary embodiments with reference to the Figures.

DETAILED DESCRIPTION OF THE INVENTION

Generally, household refuse contains about 60% of TDM, the remaining (40%) being water. As mentioned above, percentages reused herein are to be understood as percent by weight if not otherwise specified.

The TDM is composed of about 60% of ODM and of 40% of MDM (mineral dry matter such as glass, sand, stones, metals). The ODM comprises, in turn, about 60% of $ODM_{biol}$ (e.g. kitchen refuse, plant parts) and 40% of other organic components (e.g. wood, synthetic materials). These figures may of course vary within wide limits depending on the origin of the household refuse and are to be understood as approximate values only.

Figure 1:
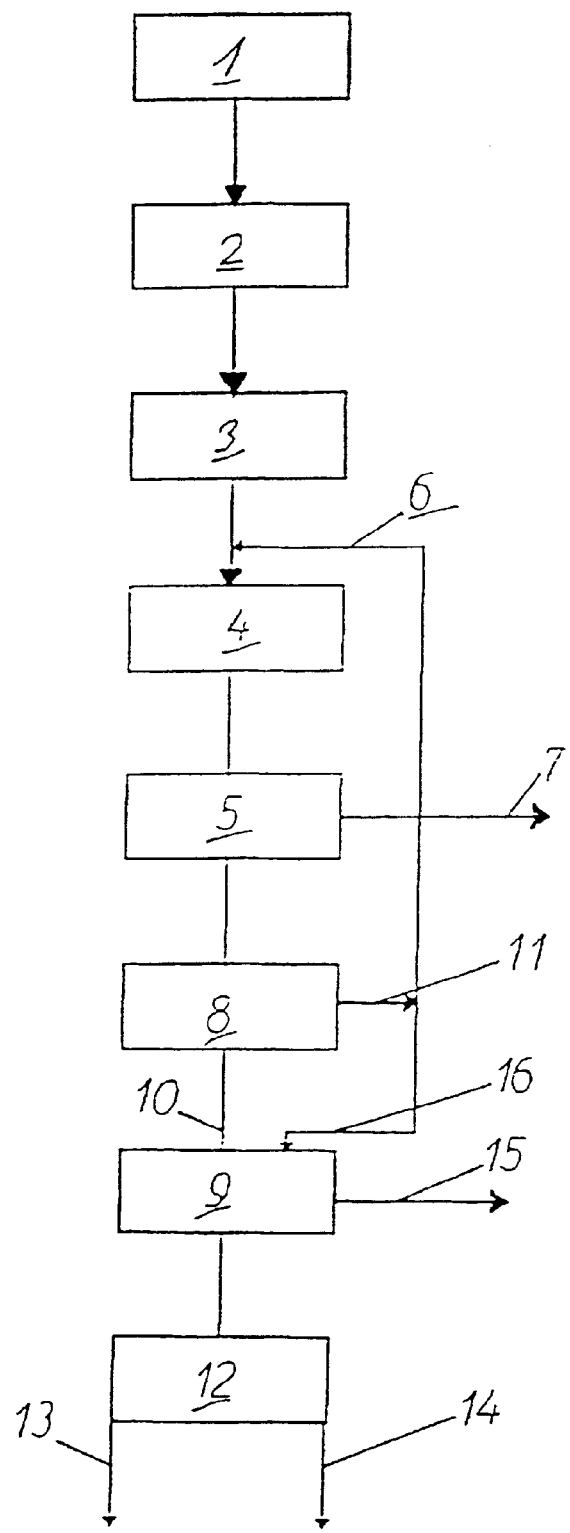
FIG. 1 is a flow-sheet of the process according to the invention.

The household refuse is first received and stored in the delivery step 1 (FIG. 1). It is then comminuted in step 2. Iron (magnetic metals) and, if present, non-iron metals are removed in step 3. A fine calibration is then effected in step 4. These process steps and the necessary devices are known as such and are used to produce a material that can be fermented under anaerobic conditions in a fermenter 5. Generally, it will be necessary to add water during the process at 6.

According to the invention, the fermentation step 5 must be conducted until exhaustion. In other words, the final product of the fermenter 5 is such that it cannot be further fermented anaerobically. Such an exhaustive fermentation step requires a fermenter which avoids a blending of more fermented material with less fermented material and in particular a mixing of the freshly introduced, unfermented material with material which has been already highly fermented. Such fermenters have for example become known from the applicant's U.S. Pat. No. 5,521,092. These fermenters comprise mixing elements, but these elements only achieve a local, vertical mixing and especially counteract sedimentation effects. The fermentation mass in the fermenter 5 rather moves as a so-called plug flow through the fermenter 5 from its entry to its exit; this means that the degree of fermentation continuously increases from the entry to the exit. Such fermenters allow a decomposition of 70% of the $ODM_{biol}$ and more. Starting from one tone (metric) of household refuse having the above indicated composition, and setting an equivalent of 0.83 m³ biogas/kg of decomposed $ODM_{biol}$, 125 m³ of biogas are obtained. With an energy equivalent of 6 kW/m³, this corresponds to a potential of 750 kW of primary energy.

The fermentation residue is then subjected to a separation step 8 to separate the residue into a liquid fraction and a solid fraction. The solid fraction 10 is fed to the drying stage 9. A fraction of the liquid fraction 11 is also fed to the drying stage and is for example, trickled upon the dry fraction at 16.

Direct drying of the fermentation residue is generally not possible because the fermentation residue is in the form of a relatively compact and air impermeable mass. However, the solid or dry fraction 10 is rather crumbly and well air permeable. Drying can therefore be effected in the simplest manner by blowing warm air through the solid fraction, and the trickled fraction of the liquid fraction 6 may be taken up as well. Exhaust air 15 which is formed during the drying stage and which is loaded with water vapour can be vented to the environment via usual biofilters. Known drying devices, such as fixed bed ovens or drum driers, may be used for the drying stage 9. However, it is also possible to modify the known composting modules for this purpose. The modules are equipped with appropriate heating elements or a supply of warm air and, optionally, with an isolation number. Instead of the composting material, the solid fraction 10 may be fed into the modified composting module. Drying is then accomplished by heating, in particular by blowing warm air through the solid fraction, the trickled liquid fraction 16 being also transferred as a vapour into the heating air. Such composting modules are known, for example from the patent publication No. EP-A-0,592,368 or the patent U.S. Pat. No. 5,434,080. Drying is continued until a dry matter content (DM) of 90% or higher is attained.

The drying stage is followed by a fine screening stage 12. The fine portion 13, having a desired upper particle size limit of from 2 to 10 mm, may be used for an industrial recovery, depending upon the material. The coarse particles 14 must be finally disposed of, for example by thermal exploitation, or in a dumping ground. A special advantage is the fact that the material coming out of the drying stage 9 is so dry and so poor in biologically degradable organic dry matter that no further decomposition processes will occur on dry storing. This product is thus appropriate for intermediate storage, even for long time periods.

A fraction of the liquid fraction 11 emerging from the separation step 8 is also used as a water supplement 6 for the pre-treatment of the fermentation material so that the addition of fresh water will not be necessary.

Figure 2:
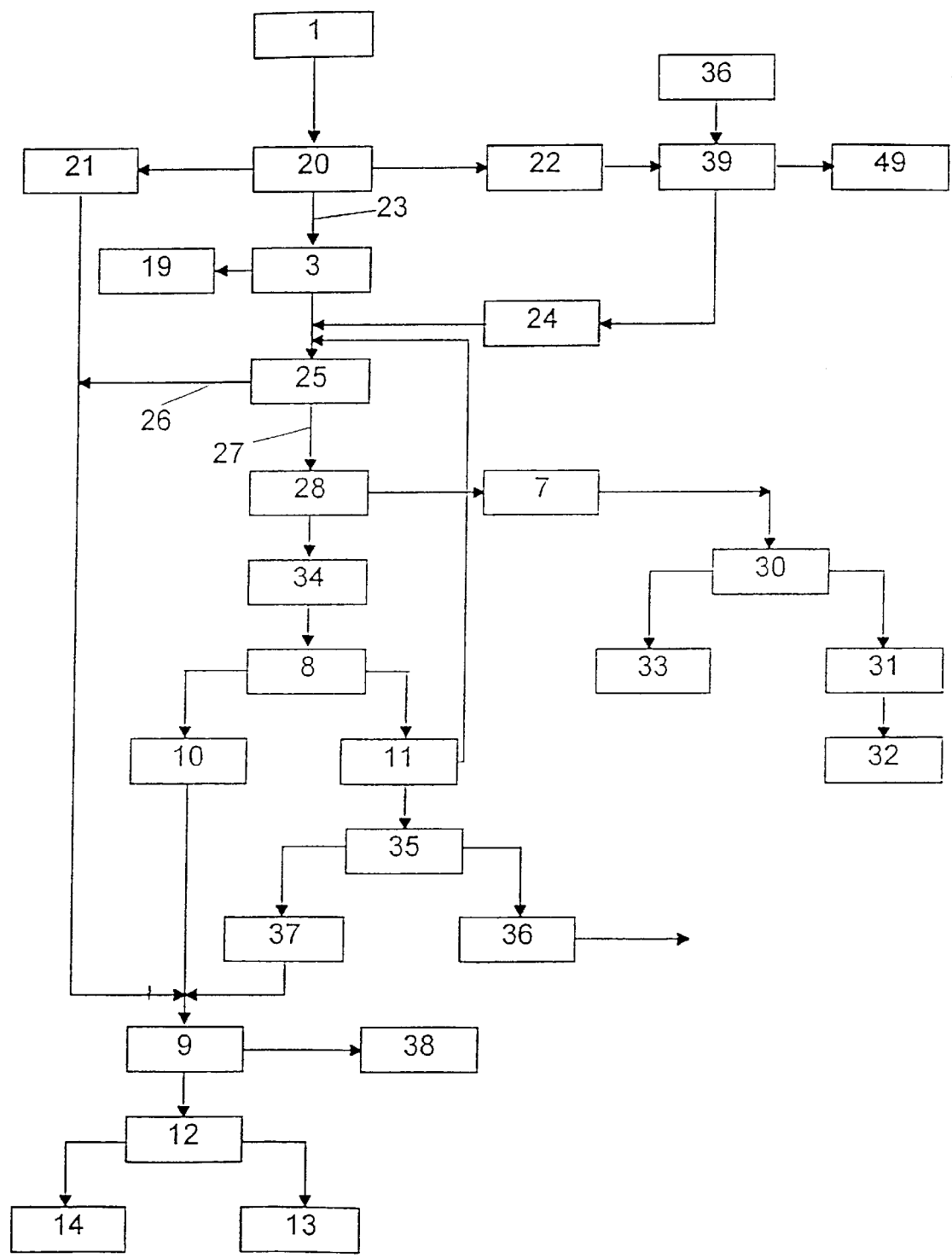
FIG. 2 shows schematically a preferred embodiment.

FIG. 2 depicts a more sophisticated embodiment of the process. Elements and steps which are identical to those already described in the above embodiment of the process have the same reference numerals. When amounts are given, the percentages refer to the above refuse composition taken as an example.

The refuse 1 is fed from the delivery step into a crusher 20 equipped with a drum sieve. The refuse is comminuted into a coarse fraction 21 (lower limit of the particle size in the range of from 100 to 300 mm, about 15 to 5%), a fine fraction 22 (upper limit of the particle size of from 15 to 40 mm, about 10 to 30%), and the predominant residue in the range or main stream of 23 which typically amounts to about 70%. The coarse fraction 21 may immediately be fed to the drying step 9.

The main stream 23 of residue is transferred into the metal removing step 3 where iron and non-iron metals 19 (3 to 4%) are removed. The return 24 from the treatment of the fine fraction 22 (see below) is added to the main stream 23, and the mixture is fed into an extruding press 25. The extruding press (see CH-A-685,981) executes a disintegration process at a pressure of up to at least 700 bar, typically 1000 bar, thereby yielding as products a relatively dry, combustible fraction 26 and a fermentable fraction 27 in the form of a pulp.

The extruding press 25 may be replaced by other separating processes or apparatus, for example manual or mechanical sorting, or screening systems which are known per se. Combinations of these methods with each other and with the extruder are also contemplated.

The combustible fraction 26 may be fed, in the same manner as the coarse fraction 21, directly to the drying step 9. The fermentable pulp fractions 27 is transferred to the fermenter 28, e.g. according to U.S. Pat. No. 5,521,092. Fermentable material must contain at least 40%, or preferably up to 70%, water, wherefore water stemming from other process steps (24, 11) may be added. The fermenter is operated, according to the invention, in such a manner that the fermentation will be an exhaustive one. Empirically, material that is not further fermentable comprises an $ODM_{biol}$ of at most 30%. The biogas 7, generated during the decomposition of at least 70% of the $ODM_{biol}$, is conducted into a cogeneration plan (block-type thermal power station) 30. The electric energy 31 which is produced is used for operating the installation, on one hand, and the major remaining portion is fed into the public power supply network 32. The heat 33 produced in the thermal power station 30 is used for drying in the drying stage 9. Assuming a typical household refuse composition containing about 20% of $ODM_{biol}$ for example, the produced heat 33 is sufficient to dry until a DM of at least 90% in the drying stage 9 so that no external energy sources are required for the drying.

The fermentation residue 34 leaving the fermenter process 28 is fed into the separator 8 for separation into the solid fraction 10 and the liquid fraction 11. This separation is effected substantially by a compression of the fermentation residue and removal of the water dripping out which contains dissolved mineral and organic components.

The liquid fraction 11 is added to the main stream 23 upstream of the fermenter 28 in order to achieve the degree of humidity required for fermentation. The remaining liquid fraction 11 is concentrated in step 35. This concentration is achieved by warming up the liquid fraction under reduced pressure, e.g. at a temperature up to 80° C. and a pressure of ½ bar. In order to avoid the release of ammonia in significant amounts and its transition into condensate 36, the pH value of the liquid fraction 11 is adjusted prior to concentration to neutral or slightly acidic (pH 5 to 6), e.g. by the addition of sulfuric acid.

A too acidic pH value should be avoided in order to prevent the formation of free volatile organic acids (amino acids).

The condensate 36 is formed during the concentration step 35, which, under these conditions is comprised of water containing very small amounts of other matter. This water may be used in the process for washing the fine fraction 22, as will be shown below, or alternatively, may be transferred to a sewage treatment plant.

The concentrate 37 is trickled on the dry fraction in the drying stage 9. During the drying procedure, the water remaining in the concentrate 37 is transformed into steam and vented to the environment together with the exhaust air, optionally after filtration in step 38 for avoiding smell nuisances.

The dried material coming from the drying stage 9 is further subjected to fine screening 12, and the coarse and fine fractions 14 or 13, respectively, which are formed, are transferred to a thermal utilization facility or, if possible an industrial utilization facility. The present invention generally yields a dry product having a crumbly consistency which may be immediately transferred to screening devices and/or sifters. For example, plastic and glass particles in this material are to a large degree free from adhering soil. It is therefore possible to separate plastic parts and other combustible materials (paper, wood, plastic sheets) that are only weakly soiled. Such mixtures are known as "fluff" and can be used as fuels.

The products leaving the drying step contain at least 90% dry matter, and preferably at least 95%.

The fine fraction 22 of the starting refuse 1, which was considered in the prior art as problem refuse, is separated according to the invention from adhering components in a washing unit 39. The fine fraction 22 is essentially comprised of inert materials which would normally be disposable without problems (glass, stones, sand, etc.) but represents a waste disposal problem only due to adhering components, in particular organic ones. Due to these organic components, this fraction would begin, e.g. in a waste dump, to decompose and to develop dump gases. Therefore, future legal regulations strongly limit the content of organic matter (ODM).

Figure 3:
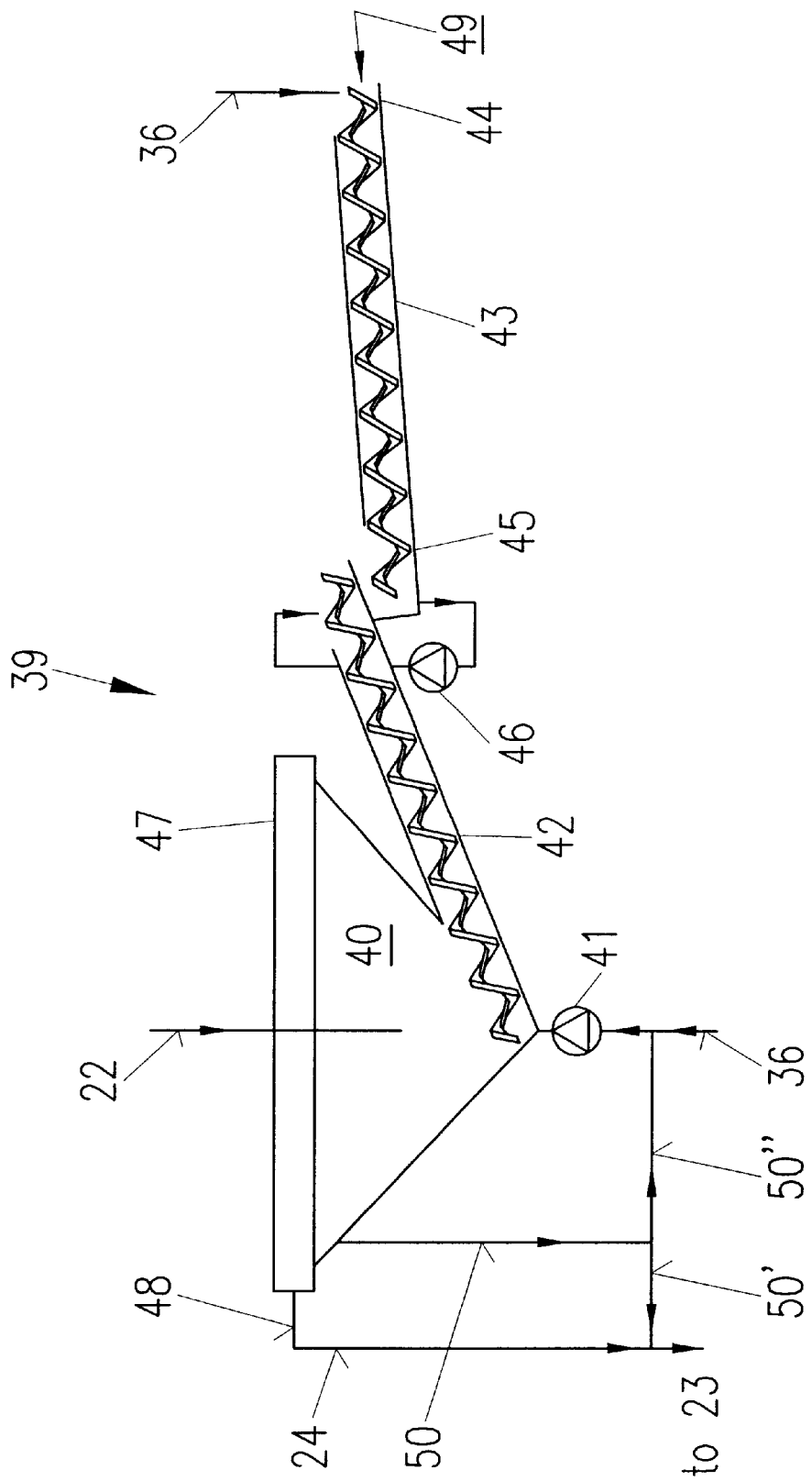
FIG. 3 shows schematically the washing unit in FIG. 2 for the fines fraction of the refuse.

As it is schematically shown in FIG. 3, the fine fraction 22 can be cleaned according to the invention in a washing unit 39 in such a manner that the ODM content (measured as the ignition loss) is at most 5%.

The fine fraction 22 is first transferred into a hydrosifter 40. The washing liquid is introduced at the bottom of the hydrosifter cone by a pump 41. The washing liquid consists of the condensate 36 and the process water 50 taken up from below the surface and circulated. Since this liquid 50 will, in time, be enhanced with dissolved substances, a portion 50' thereof must be eliminated, leaving the fraction 50" and the essentially clean condensate 36 as the washing liquid. Another supply of polluted water comes from the washing spirals 42 and 43. Conventional fed screws (see U.S. Pat. No. 5,434,080) may serve this purpose. The washing spiral 42 takes up the material deposited on the ground and feeds it upwards by the rotation of the spiral where it is charged into a second washing spiral 43 disposed at a flatter angle then the washing spiral 42. At the output end 44 of the washing spiral 43, condensate water 36 is added which moves countercurrently to the conveyed material through the spiral 43 and washes back the material adhering to the inert material. The washing water is collected at the input end 45 and fed by a pump 46 to the output of the first washing spiral 42. The washing water flowing back through the washing spiral 42, which is already polluted, brings about a preliminary purification of the material conveyed in the screw 42.

The content of specifically lighter material 48 collected at the surface by the wiping device 47 is recirculated as a reflux 24, together with the separated circulating water portion 50' into the main stream 23 of the household refuse.

The content of specifically lighter material 48 collected at the surface by the wiping device 47 is recirculated as a reflux 24, together with the separated circulating water portion 43, into the main stream 23 of the household refuse.

The material 49 leaving the spiral 43 is finely divided, inert and sufficiently purified to he disposed of with only minor problems and at low cost.

As a whole, the process allows to obtain a mass reduction, unattained until now, of household refuse especially through the removal of water and of ODM. Besides that, fractions are generated that can be industrially utilized or which represent a reduced environmental risk and which therefore, may finally be disposed of without problems and at lower cost than prior systems. An installation for the implementation of the process may comprise elements which are already known per se and which need therefore not be described in detail. It is therefore possible to the one skilled in the art to design a plurality of configurations of refuse processing installations that correspond to the general ideas of the invention but which differ from the examples, without departing from the scope of protection of the invention.

What is claimed is:

1. A biological-thermal process for the treatment of refuse comprising:
   anaerobically fermenting at least an essential portion of the refuse which is accessible to fermentation to produce a fermentation residue;
   drying the fermentation residue without intermediate composting until a dry matter content of at least 90% is attained;
   separating a fine fraction from the refuse before the anaerobically fermenting step, the fine fraction particles having an upper particle size in the range of from about 15–40 mm; and
   washing the fine fraction in a counter stream of washing liquid.

2. The process according to claim 1, wherein the step of drying is continued until a dry matter content of at least 95% by weight is attained.

3. The process according to any one of claims 1 and 2, further comprising the step of sifting the dried material in order to separate the dried material into fractions of different particle size.

4. The process according to any one of claims 1 and 2 further comprising the step of sifting the dried material in order to separate the dried material into fractions of different materials.

5. The process according to any one of claims 1 and 2 further comprising the step of sifting the dried material to separate the dried material into fractions of different specific gravity or mass.

6. The process according to any one of claims 1 and 2, wherein the fermented material has a content of biologically degradable dry matter of at most 30% by weight of the portion present prior to fermentation.

7. The process according to claim 6 further comprising the step of presorting a portion of the refuse containing the fermentable portion by a separation process.

8. The process according to claim 6 further comprising the step of presorting essentially the entire refuse stream by a separation process.

9. The process according to claim 7, wherein the step of presorting comprises separating the refuse using an extruding press having a final operation pressure on the order of at least 700 bar, manual sorting, screening, or combinations thereof, whereby a solid matter portion and a pulp portion are produced, the pulp portion containing essentially all of the biologically degradable organic substance content in said refuse to be subjected to anaerobic fermentation.

10. The process according to claim 8, wherein the step of presorting comprises separating the refuse using an extruding press having a final operating pressure on the order of at least 700 bar, manual sorting, mechanical sorting, screening, or combination thereof, whereby a solid matter portion and a pulp portion containing essentially all of the biologically degradable organic substance content in said refuse to be subjected to anaerobic fermentation are processed.

11. The process according to any one of claims 1 and 2 wherein a biogas is formed during the step of anaerobic fermentation and further comprising the step of combusting the biogas to produce energy.

12. The process according to claim 11 wherein a biogas is formed during the step of anaerobic fermentation and further comprising the step of combusting the biogas to produce energy.

13. The process according to claim 11 further comprising the step of using said energy during the step of drying whereby the energy required for the drying step is essentially totally supplied by the combusted biogas.

14. The process according to claim 11 wherein the energy produced by the step of combusting the biogas is sufficient for drying the total amount of the refuse, essentially by vaporization or forced evaporation of the water content thereof.

15. The process according to any one of claims 1 and 2 wherein the step of fermenting produces a fermentation residue and further comprising the steps of mechanically separating a liquid fraction from the fermentation residue; and concentrating the liquid fraction by vaporization of water until a dry matter content of at least 35% is achieved.

16. The process according to claim 6 wherein the step of fermenting produces a fermentation residue and further comprising the steps of mechanically separating a liquid fraction from the fermentation residue; and concentrating this liquid fraction by vaporization of water until a dry matter content of at least 35% is achieved.

17. The process according to claim 16, further comprising the step of adjusting the pH of the liquid fraction prior to the step of concentrating, said step of adjusting further comprising creating a pH level in the range of a neutral to slightly acidic.

18. The process according to claim 17 wherein the step of adjusting pH value further comprises adjusting the pH to a value in the range of from about 5 to 6 in order to suppress formation of gaseous ammonia during the step of concentrating.

19. The process according to claim 1, further including the step of recirculating at least one of lighter material collected during the washing step and a portion of the washing liquid so as to form part of the refuse that is fermented in the anaerobically fermenting step.

20. A process for the treatment of a fine fraction of refuse, said fine fraction having an upper particle size within the range of from about 15 to 40 mm, comprising the steps of:
   conveying the fine fraction in a hydrosifter having a bottom and having an associated washing spiral, and said washing spiral having input end, a discharge end, and a conveyance direction;

carrying away, by means of said washing spiral, the portion of said fine fraction which settles at the bottom of the hydrosifter; and introducing a washing liquid into the discharge end of the washing spiral and running said washing liquid through the washing spiral in a counter direction to the washing spiral conveyance direction whereby substances adhering to the refuse particles are carried back into the hydrosifter.

21. The process according to claim 20 further comprising the steps of:

separating the fine fraction from a refuse which is accessible to fermentation, the fine fraction particles having a particle size in the range of from 15–40 mm;

conveying the refuse to a fermenter;

anaerobically fermenting at least an essential portion of the refuse thereby producing a fermentation residue;

separating a liquid fraction from the fermentation residue and concentrating the liquid fraction by vaporization of water;

condensing said vaporized water thereby obtaining a liquid condensate and using said liquid condensate as a washing liquid in the washing spiral; and drying the solid fraction of the fermentation residue, without intermediate composting to a dry matter content of at least 90%.

22. The process according to claim 21 wherein said step of introducing washing liquid uses polluted water and further comprising the step of humidifying the solid fractions of the fermentation residue using polluted water.

23. The process according to claim 20, wherein the central axis of the washing spiral defines a void so as to permit material to flow back over threads of said washing spiral.

* * * * *